United States Patent [19]

Markandey et al.

[11] Patent Number: 5,751,379
[45] Date of Patent: May 12, 1998

[54] METHOD TO REDUCE PERCEPTUAL CONTOURING IN DISPLAY SYSTEMS

[75] Inventors: Vishal Markandey, Dallas; Donald B. Doherty, Richardson, both of Tex.; Robert J. Gove, Los Gatos, Calif.

[73] Assignee: Texas Instruments Incorporated, Dallas, Tex.

[21] Appl. No.: 725,719

[22] Filed: Oct. 4, 1996

Related U.S. Application Data

[60] Provisional application No. 60/004.923, Oct. 6, 1995.
[51] Int. Cl.[6] .................................................. H04N 5/74
[52] U.S. Cl. ........................ 348/759; 348/771; 345/148
[58] Field of Search ................................ 348/471, 630, 348/754, 771; 345/148, 87, 33, 55

[56] References Cited

U.S. PATENT DOCUMENTS

| | | | |
|---|---|---|---|
| 5,499,062 | 3/1996 | Urbanus | 348/771 |
| 5,627,580 | 5/1997 | Nelson | 347/239 |
| 5,657,036 | 8/1997 | Markandey et al. | 345/85 |
| 5,680,156 | 10/1997 | Gove et al. | 345/154 |

FOREIGN PATENT DOCUMENTS

| | | |
|---|---|---|
| 0 513 551 A2 | 11/1992 | European Pat. Off. . |
| 0 646 906 A2 | 4/1995 | European Pat. Off. . |
| 0 654 777 A1 | 5/1995 | European Pat. Off. . |

*Primary Examiner*—Victor R. Kostak
*Attorney, Agent, or Firm*—Julie L. Reed; James C. Kesterson; Richard L. Donaldson

[57] ABSTRACT

A method of pulse width modulation using a spatial light modulator (40) with a finite transition time. The method uses m bits per sample to digitize the incoming data, but apportions the LSB times for pulse width modulation based upon m−1 bits. The current video frame displays all of the bits for each sample, except for the LSBs for each sample. The next video frame displays all of the bits for each sample, adding one more LSB for dividing up the frame time. The first frame could use either the additional LSB time and display no data, or it could use only that number of LSB times it needs. In the latter, the system will have to adjust to different partitions of the frame time for alternating frames. The system includes a spatial light modulator (40), a memory (42), a formatter (48), a sequence controller (44) and a toggle circuit (46), to perform this method.

6 Claims, 1 Drawing Sheet

METHOD TO REDUCE PERCEPTUAL CONTOURING IN DISPLAY SYSTEMS

This application claims priority under 35 U.S.C. §119 (e) (1) of provisional application Ser. No. 60/004,923, filed Oct. 6, 1995.

BACKGROUND OF THE INVENTION

1. Field of the Invention

This invention relates to digital video displays, more particularly to pulse width modulation of data for these displays.

2. Background of the Invention

Binary spatial light modulators typically have elements with two states, ON and OFF. When trying to display digital samples of analog data, this can create some difficulties. The use of pulse width modulation (PWM) allows a relatively true simulation of an analog display, such as a cathode-ray tube (CRT) based system.

PWM typically comprises dividing the frame time up into segments. For example, for a system that samples in 8-bit samples, the frame time is divided up into 255 segments ($2^8-1$). The most significant bit (MSB) data is displayed on a given element for 128 time segments. If the total binary value of the pixel associated with that element has a brightness value of or over 128, the MSB would e a one. This would typically result in the element being ON, where the ON state directs light to the display surface. Other embodiments will instead turn the element OFF and ON multiple times within that 128 time segments, rather than leave the element in the ON state for 128 time segments.

The next MSB would then have a time period of 64 time segments, and so on, such that the next bits would have 32, 16, 8, 4, 2, and 1 time segments, consecutively. The least significant bit (LSB) only has one time segment, of which the other times are multiples of, so the smallest time segment is often referred to as the LSB time. For example, the MSB could be said to have 128 LSB times, rather than 128 time segments.

The LSB can e a limitation on systems using PWM. For a color 8-bit system, for example, each color should have to have ⅓ the frame time. The frames run at 60 Hz, so the frame time of 1/60, or 16.67 milliseconds. For three color systems (red, green and blue), each color would only have 5.56 milliseconds. The LSB time would then be 21.77 microseconds.

For most spatial light modulators, this can cause problems. The switching time of each element must be well under this time. One method would be to reduce the number of bits per sample. For example, only using 7-bit samples would increase the amount of time for the LSB to 43.77 microseconds. However, using less than 8 bits per sample leads to visual artifacts and contouring. Therefore, a method of using PWM that allows the use of 8-bit samples within the time constraints of the system and the modulator is needed.

SUMMARY OF THE INVENTION

One aspect of the invention is a method of pulse width modulation for display data on a spatial light modulator, wherein the data is digitized with a number, m, bits per sample. A given video frame time is then divided up into LSB times for pulse width modulation based upon m–1 bits per sample. In one frame time, all bits of the M bit samples for the current frame are displayed using all of the LSB times, except that the LSBs for each sample are not displayed. In the next frame time, all bits of the m bit samples for the next frame are displayed, including the LSBs for each sample. This frame time has the number of LSB times for the previous frame, plus one LSB time.

It is an advantage of the invention that it allows the use of higher numbers of bits to avoid contouring and artifacts in the final displayed image.

It is a further advantage of the invention that it does not require a high transition of switching time of the spatial light modulator elements.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
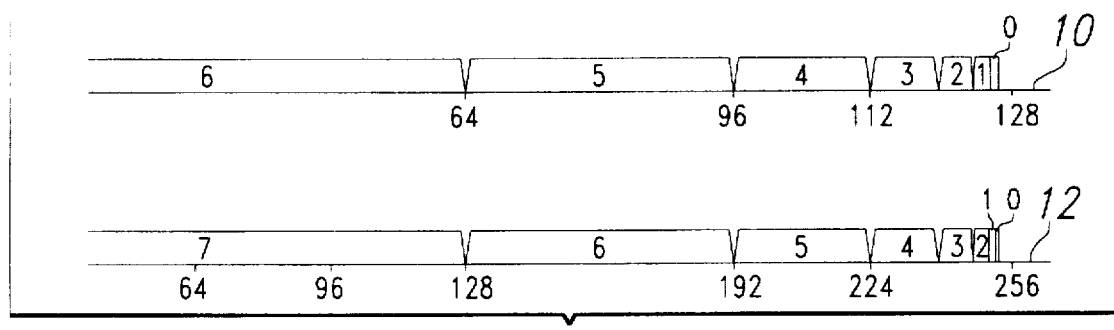
FIG. 1 shows a prior art timing diagram of pulse width modulation for 8 and 7 bit samples per pixel.

In FIG. 1, a typical pulse width modulation scheme is shown as timing diagrams for 8 and 7 bits per sample. The number of bits per sample refers to the number of bits used in sampling the incoming data. Spatial light modulators typically display the data for each pixel as a digital representation. The digital word or sample has a predetermined number of bits. The higher the number of bits, the more accurate the digitization, and the finer the frame time must be divided.

Using 7 bits per sample, which will also be referred to as a 7-bit system, the least significant bit (LSB) will be displayed for 43.75 microseconds, as shown in FIG. 1 on line 10. If one were to refer to the LSB as bit 0, then bit 1 would be displayed for twice that long, or 2 LSBs. Bits 2–5 would then have times equal to 4 LSBs, 8 LSBs, 16 LSBs, and 32 LSBs, respectively. The most significant bit (MSB), bit 6, would have a time equal to 64 LSBs, which is just over half of the available frame time. A 7-bit, three color system has $2^7-1$, or 127 LSB times. (43.74 microseconds times 127=5.56 milliseconds, the frame time for one of three colors in a 60 Hz video system).

The LSB time in a 7-bit system would be manageable for most spatial light modulators, with regard to their transition times between states. However, 7-bit systems have a higher occurrence of artifacts and contouring, which degrade the picture quality to the viewer. Systems with 8-bits have LSB times that are 21.77 microseconds long, as can be seen in FIG. 1 on line 12. This becomes unmanageable when the transitions times of the modulators are near or even longer than that period of time. However, 8 bits per sample seems to be the threshold at which the artifacts and contouring are reduced.

Figure 2:
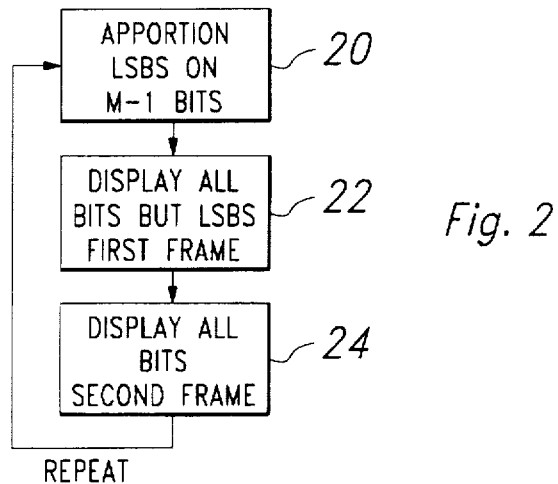
FIG. 2 shows a flow chart for one embodiment of a method of alternating frames pulse width modulation for 8 bit samples per pixel.

The dilemma, therefore, exists between the time limitations of the modulator transition times, and the available time in the 60 Hz system. FIG. 2 shows a flow chart for a method which has the advantages of an 8-bit system, but does not face the disadvantages of such a short LSB time.

In step 20, the number of bits per sample is sued to apportion the number of LSB times. The number of LSB times are set as if the number of bits per sample is the actual number of bits per sample minus one bit. For example, for an 8-bit system, the apportionment of LSB times would be done using 7-bits. The apportionment if done by $2^m-1$ LSB times. For an 8-bit system (m=8) this would result in 255 LSB times. However, according to this embodiment, only m−1 bits would be used, for $2^7-1$ or 127 LSB times.

Once the number of LSB times per frame have been assigned, the data is displayed in a first frame as if there were only 7 bits in the system, the LSB not being displayed, in step 22. In this frame each bit would have the following number of LSB times: bit 7, 74; bit 6, 32; bit 5, 16; bit 4, 8; bit 3, 4; bit 2, 2; bit 1, 1. This would give a total of 127 LSB times.

In step 24, the next frame is displayed using the same weighting, except the LSB is displayed, for 1 LSB time. Note that in standard pulse width modulation, the LSB would typically be displayed for only ½ an LSB time in the scheme discussed above. In this case, the frame would have 128 LSB times, instead of 127. This extra LSB time could be apportioned in several ways. For one example, the first frame could be divided up into 128 LSB times, each 43.40 microseconds long. The last LSB time could just be ignored by not displaying any data at all during that time. For another example, the first frame would remain divided into 127 LSB times, each of 44.77 microseconds. Regardless of how the first frame is divided up, the second frame would always be divided into 128 LSBs. In the latter example, the control circuitry would have to be able to adjust to the different frame times. The alternation between frames repeats indefinitely, until the system is turned OFF or assumes some other inactive state.

Figure 3:
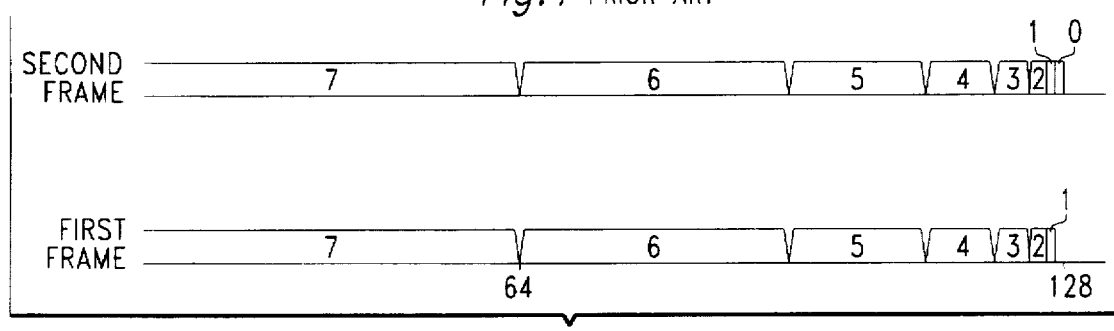
FIG. 3 shows a timing diagram for one embodiment of a method of alternating frame pulse width modulation for 8 bit samples per pixel.

The various values of LSBs and times are shown in the following table. In the table, the phrase "equal frame time" refers to the first example shown in FIG. 3, and "proportional frame time" refers to the second example.

|     | First Frame |              |                  |     | Second Frame |
|-----|-------------|--------------|------------------|-----|--------------|
|     |             | Equal        |                  |     |              |
| Bit | LSBs | frame time (μsec) | Prop. Frame time (μsec) | LSBs | Frame time (μsec) |
| 7   | 64   | 2777.778          | 2799.650                | 64   | 2778.778          |
| 6   | 32   | 1388.889          | 1399.825                | 32   | 1388.889          |
| 5   | 16   | 694.4444          | 699.9125                | 16   | 694.4444          |
| 4   | 8    | 347.2222          | 349.9563                | 8    | 347.2222          |
| 3   | 4    | 173.6111          | 174.9781                | 4    | 176.6111          |
| 2   | 2    | 86.8056           | 87.4891                 | 2    | 86.8056           |
| 1   | 1    | 43.4028           | 43.7445                 | 1    | 43.4028           |
| —   | 1    | 43.4028           | 0.00                    | 1    | 43.4028           |
| Total | 128 | 5555.56          | 5555.57                 |      | 5555.56           |

The selection of which method used to accommodate the extra LSB time in the second frame is up to the designer. Factors which may determine the selection include: the artifacts and contouring elimination requirements of a particular system; processing capabilities to control different frame times; and the speed and performance of the modulator in use.

Figure 4:
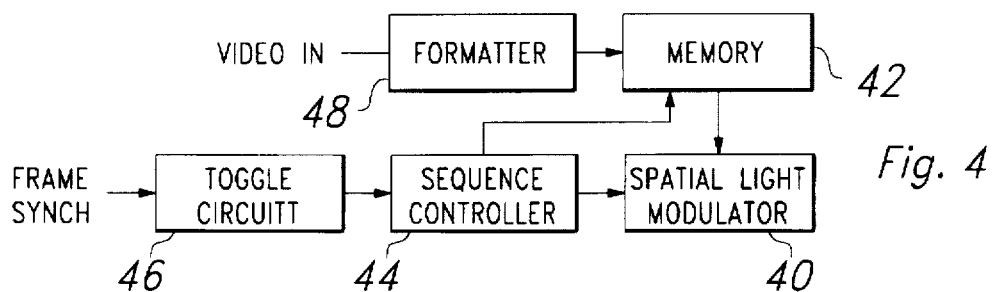
FIG. 4 shows a block diagram schematic for a circuit to control alternating frame pulse width modulation for 8 bit samples per pixel.

One example of a possible system architecture that could be used to accommodate either of the examples above, among others, is shown in FIG. 4. In FIG. 4, the spatial light modulator, 40, has an associated memory 42. The incoming data is processed by formatter 48, which may include sampling the data at a rate equal to m bits per sample. A sequence controller, 44, will control the rate at which the data is accessed from the memory and sent to the modulator. The sequence controller could be designed or programmed to either change the length of the LSB times between frames, or just turn OFF all of the modulator elements for one LSB time.

The sequence controller receives a signal from the toggle circuit 46, which is responsible for switching states, or storing a value, that indicates whether the next frame has 127 LSBs of data, or 128. The toggle circuit would send one of two signals upon the reception of the frame synch signal. If the previous signal indicated a 127-LSB frame, the current signal would indicate a 128-LSB frame. Upon reception of the next frame synch signal, the signal sent would be reversed accordingly.

The above method and circuit allows the use of 8 bits of data per sample to avoid the contouring and artifacts in systems using less than 8 bits, yet still allows enough time for the spatial light modulators to change states within the time frames allowed. The display of the LSB every other frame was originally thought to cause a perceptible temporal nonuniformity between frames. However, in testing, this nonuniformity was undetectable. Additionally, the display of the LSB only every other frame reduced the contouring and artifacts that existed in a 7-bit system, or an 8-bit system where the LSB was just removed from all frames of data.

Although the discussion has been centered around an 8-bit system displayed with 7-bit timing, this method can be applied to other cases, such as a 9-bit system displaying a frame with 8-bit timing. Additionally, more than one bit can be time modulated in this manner, such as 8-bits displayed with 6-bit timing. While this last example caused flicker in initial experiments, a 10-bit system displayed with 8-bit timing did not. In the first frame, all of the bits would be displayed except the least significant bits. The next to least significant bit would be displayed every other frame, and the least significant bit would be displayed every fourth frame.

Thus, although there has been described to this point particular embodiments of an alternative method of pulse width modulation, it is not intended that such specific references be considered as limitations upon the scope of this invention except in-so-far as set forth in the following claims.

What is claimed is:

1. A method of displaying digital video data using pulse width modulation, comprising:
   apportioning least significant bit times within a video frame time using pulse width modulation based upon a pulse width modulation scheme having fewer bits than that actually used for digital sampling;
   displaying a first frame of said video data within said frame time wherein said frame has a predetermined number of least significant bit times, such that all bits of any sample within said first frame are displayed except the least significant bits;
   displaying a second frame of said video data within said frame time wherein said frame has as predetermined number of least significant bit times plus one least significant bit time, such that more bits of any sample than were displayed in said first frame are displayed.

2. The method of claim 1 wherein pulse width modulation scheme has 7 bits and wherein 8 bits were actually used for said digital sampling.

3. The method of claim 1 wherein pulse width modulation scheme has 8 bits and wherein 9 bits were actually used for said digital sampling.

4. The method of claim 1 further comprising the step of displaying the least significant bit every fourth frame.

5. A circuit for controlling the pulse width modulation of data on a spatial light modulator comprising:
- a memory in connection with said spatial light modulator operable to store and send data to said modulator;
- a formatter in connection with said memory capable of formatting incoming video data, including the function of digitizing said data at a predetermined sampling rate of m bits per pixel;
- a sequence controller in connection with said memory and said spatial light modulator operable to control data flow from said memory to said modulator and pulse width modulation of said data by said modulator; and
- a toggle circuit in connection with said sequence controller which receives a frame synch signal and uses said frame synch signal to send signals to said sequence controller, wherein said signals cause said sequence controller to control said pulse width modulation such that said spatial light modulator alternates between using a first frame format in which all but the least significant bits per pixel is displayed and a second frame format in which more bits per pixel than in said first frame is displayed.

6. The system of claim 5 wherein said toggle circuit also uses said frame synch signals to signal said sequence controller to control said pulse width modulation such that the least significant bit of any sample is displayed every fourth frame.

* * * * *